May 28, 1940.   J. C. EHRLICH ET AL   2,202,047
CABINET FOR FILING MICROSCOPIC SLIDES
Filed Sept. 3, 1937
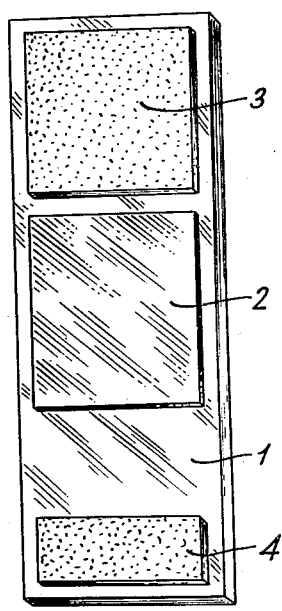
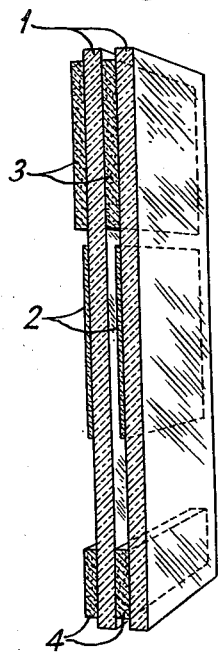
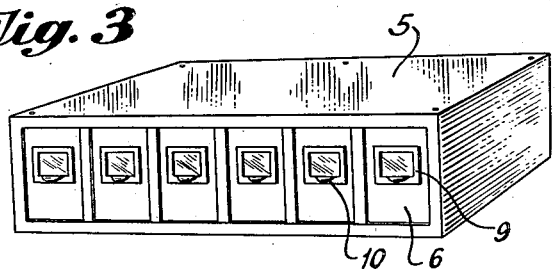
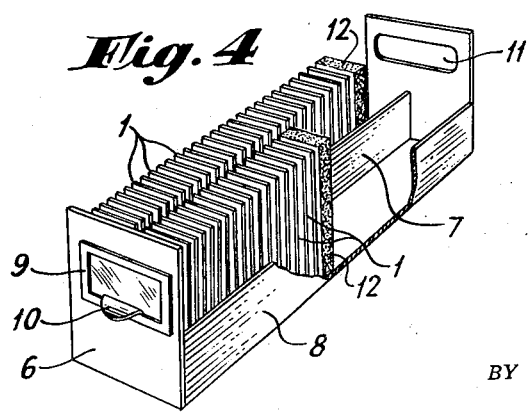
INVENTORS
JOSEPH C. EHRLICH AND
IRVING J. EHRLICH
BY Charles H. Brown
ATTORNEY.

Patented May 28, 1940

2,202,047

UNITED STATES PATENT OFFICE 2,202,047

CABINET FOR FILING MICROSCOPIC SLIDES

Joseph C. Ehrlich and Irving J. Ehrlich, New York, N. Y.

Application September 3, 1937, Serial No. 162,265

1 Claim. (Cl. 129—27)

This invention relates to improvements in microscopic slides and to methods for filing the same.

In pathological laboratories, hospitals and the like, it is the customary practice to place diseased tissues, cultures, etc., on a glass slide, arrange a cover glass over the portion of the slide on which the specimen is, and secure a label to the slide by means of which it can be identified.

The present system of handling such slides has many disadvantages. Due to the inevitable spreading of the adhesive beyond the edges of the cover glass it is necessary to keep the slides out of contact with each other to prevent the adhesive on a slide from sticking to adjacent slides. It is the usual practice to place the slides on trays for a period of time sufficient to permit the adhesive to dry and this necessitates the use of a large number of open trays. As a result slides are difficult to locate, breakage occurs and dust collects on the exposed slides.

The slides are usually numbered serially by pasting thin gummed paper labels on them and filed. Even though the adhesive has had ample time to dry, it is the customary practice to file the slides out of contact with each other. Frequently the adhesive will soften in warm weather, or because of other reasons. It has therefore been the practice to provide drawers of filing cabinets with spaced grooves in their side walls, spaced from each other a distance greater than the thickness of the slides so that the slides can be filed by inserting the edges in grooves on opposite sides of the drawer and kept in such spaced relation. When the slides are to be used they must be removed from the drawers of the cabinet, placed on trays and carried to the table on which the microscope is arranged.

In the present invention we provide means whereby microscopic slides may be arranged in contact without adhering to each other. They may be permanently filed without the delay heretofore necessary to permit drying of the adhesive and may be filed in contact with each other. This saves space permitting the slides to be filed in drawers which may be taken from the cabinet to the table for examination. It also results in considerable less handling of the slides thereby reducing breakage to a minimum and reducing the possibility of misplacing the slides by improper filing.

In the accompanying drawing we have shown one form of the invention. In this showing:

Fig. 1 is a front view of a slide;

Fig. 2 is an end elevation of several slides arranged in stacked relation;

Fig. 3 is a perspective view of a cabinet in which the slides may be filed; and

Fig. 4 is a perspective view, parts being shown in section of one of the drawers of the filing cabinet showing the slides arranged therein.

Referring to the drawing, the reference numeral 1 designates a microscopic slide of the usual character. The diseased tissue, culture or the like is arranged on the face of the slide in the usual manner and covered by a cover glass 2 which is secured to the slide by an adhesive. In order to permit the slides to be arranged in substantial contact with each other, without sticking to each other at the point where the cover glass is secured to the slide, we provide spacers 3 and 4 arranged adjacent each end of the slide. These spacers may be made of any suitable material but are preferably made of a heavy paper in order that the slide number or other indexing indicia may be placed on one of the spacers in place of the labels heretofore employed. Referring to Fig. 2 of the drawing it will be noted that the spacers 3 and 4 are of appreciable thickness, greater than the thickness of the cover glass 2. As a result of this increased thickness the slides are maintained spaced from each other, and the cover glass on one slide does not contact with the adjacent surface of the adjacent slide.

By providing the spacers which permit the slides to be arranged in the stacked relation shown in Fig. 2 of the drawing without adhering to each other, the slides may be filed compactly instead of being kept in open trays or filed in cabinets having channels formed in the walls of the drawers to receive the ends of the adjacent slides and maintain them in spaced relation. Referring to Figs. 3 and 4 of the drawing, the cabinet consists of a metallic framework 5 adapted to receive a plurality of metallic drawers 6. The drawers may be of proper size to receive one row of slides but we preferably provide them of sufficient width to receive two rows with a central metallic dividing wall 7 which is of less height than the length of the slides. Each half of the drawer is of a width substantially equal to the width of the slide permitting a plurality of slides to be set on end and arranged in the drawer in contact with each other, as shown in Fig. 4. The side walls 8 of the drawers are of substantially the same height as the partition 7, which permits ready access to the slides in each row, each row being an outside row so that any slide or group of slides can be readily removed from the drawer. The drawer is provided with a metal frame 9 on the front adapted to receive a label or index card and this frame is provided with the usual handle 10. The rear wall of the drawer may be provided with an opening 11 which permits it to be grasped by the attendant or operator so that the entire drawer which is relatively light in weight can be removed from the cabinet and taken to the table on which the microscope is arranged. In this way there is provided a combination drawer and tray arrangement. With the large cabinet drawers heretofore used it was necessary to remove the desired slides from the drawer, place them on a tray and carry them to the table resulting in much unnecessary handling and frequent breakage.

In order to support each row of slides 1 in upright position when the drawer is not completely filled, there is provided a holder and follower in the form of a compressible rubber block 12 which is of substantially the same size as the slides and of much thicker dimensions, as shown. Block 12, when in the position shown in the drawing, presses against the side wall 8 and the central dividing wall 7, thus maintaining the row of slides in a vertical position.

The advantages of the construction and method of filing will be apparent from the foregoing description. The slides can be placed in the drawer as soon as the cover plate and spacers have been secured to them and the spacers may be employed as labels for the reception of indexing data and the like. The elimination of the thin paper labels heretofore used tends to prevent or decrease the number of instances in which the labels become detached from the slides making the identification of such slides difficult if not impossible. However, the most obvious and important advantage of the invention is the ability to file the slides in substantial contact with each other, that is, with the spacers carried by one slide contacting with the rear surface of the adjacent slide but with the cover glasses maintained out of contact with the adjacent slides.

What is claimed is:

A light-weight combined drawer and tray for filing relatively thin microscopic slides of the type which may be arranged in contact without adhering to each other, comprising a bottom, front and rear metallic walls and side metallic walls, a longitudinal metallic partition dividing said drawer into two parts, each of which is of substantially the same width as the slides to be filed, said width being appreciably shorter than the length of said slides, the side walls and said partition being of less height than the slides to permit access to each row of slides in said drawer, the rear wall of said drawer being provided with an opening, a handle on the front wall of said drawer, whereby said drawer can be removed from a cabinet and carried in the manner of a tray, and an elastic holder of light weight for said slides in the form of a compressible rubber block of substantially the same size as and of much thicker dimensions than said slides in each part of said drawer for maintaining the slides in vertical position.

JOSEPH C. EHRLICH.
IRVING J. EHRLICH.